United States Patent [19]
Jones

[11] Patent Number: 5,924,783
[45] Date of Patent: Jul. 20, 1999

[54] SYSTEM FOR CONTROLLING CONTRAST IN PROJECTION DISPLAYS

[75] Inventor: Philip J. Jones, Ogbourne St. George, United Kingdom

[73] Assignee: Raychem Corporation, Menlo Park, Calif.

[21] Appl. No.: 08/900,089

[22] Filed: Jul. 24, 1997

Related U.S. Application Data

[51] Int. Cl.⁶ ................................................. G03B 21/14
[52] U.S. Cl. ............................................. 353/97; 353/38
[58] Field of Search ............................. 353/31, 34, 37, 353/38, 97, 102; 349/5, 8, 61, 62

[56] References Cited

U.S. PATENT DOCUMENTS

| | | | |
|---|---|---|---|
| 3,709,137 | 1/1973 | Starp | 95/64 D |
| 4,048,493 | 9/1977 | Lee | 250/205 |
| 4,060,318 | 11/1977 | Hansford | 353/42 |
| 4,468,720 | 8/1984 | Arai | 362/281 |
| 4,498,742 | 2/1985 | Uehara | 350/523 |
| 4,505,569 | 3/1985 | Seto et al. | 355/3 R |
| 4,668,077 | 5/1987 | Tanaka | 355/30 |
| 4,693,557 | 9/1987 | Fergason | 350/331 R |
| 4,789,221 | 12/1988 | True | 350/162.12 |
| 4,891,738 | 1/1990 | Richardson et al. | 362/282 |
| 5,098,184 | 3/1992 | Van Den Brandt et al. | 353/38 |
| 5,113,332 | 5/1992 | Richardson | 362/282 |
| 5,170,194 | 12/1992 | Kurematsu et al. | 353/52 |
| 5,172,222 | 12/1992 | Plantier | 358/61 |
| 5,172,254 | 12/1992 | Atarashi et al. | 359/41 |
| 5,300,967 | 4/1994 | Kamon | 353/97 |
| 5,371,559 | 12/1994 | San-Nohe et al. | 353/31 |
| 5,379,083 | 1/1995 | Tomita | 353/122 |
| 5,398,081 | 3/1995 | Jones | 358/742 |
| 5,418,583 | 5/1995 | Masumoto | 353/38 |
| 5,473,393 | 12/1995 | Manabe | 353/97 |
| 5,597,223 | 1/1997 | Watanabe et al. | 353/97 |
| 5,607,216 | 3/1997 | Kaneko et al. | 353/97 |
| 5,622,418 | 4/1997 | Daijogo et al. | 353/97 |
| 5,662,401 | 9/1997 | Shimizu et al. | 353/38 |

FOREIGN PATENT DOCUMENTS

| | | | |
|---|---|---|---|
| 0 537 708 A1 | 4/1993 | European Pat. Off. | G02F 1/1335 |
| 0 537 731 A1 | 4/1993 | European Pat. Off. | G03B 27/72 |
| 5-19346 | 1/1993 | Japan | G03B 21/00 |
| 2 226 174 | 6/1990 | United Kingdom | G09F 9/35 |

OTHER PUBLICATIONS

Nagae et al., SID 95 Digest, pp. 223–226 (1995).
Derwent Abstract WPI 93–071705/0 (abstract of JP 05–019345 (Matsushita Electric)).
Patent Abstracts of Japan, vol. 095, No. 010, Nov. 30, 1995 (abstract of JP 07/175016, Matsushita Electric).

*Primary Examiner*—William Dowling
*Attorney, Agent, or Firm*—Herbert G. Burkard; Yuan Chao

[57] ABSTRACT

An optical projection system has a display cell that is configured to project a display image in response to light striking the display cell. The system has a light source that is configured to project a beam of light and a lens array that is positioned to intercept the beam and generate multiple beamlets of the beam. An aperture assembly is positioned to intercept the beamlets and is configured to selectively control which portions of the images contained in the beamlets strike the display cell.

18 Claims, 5 Drawing Sheets

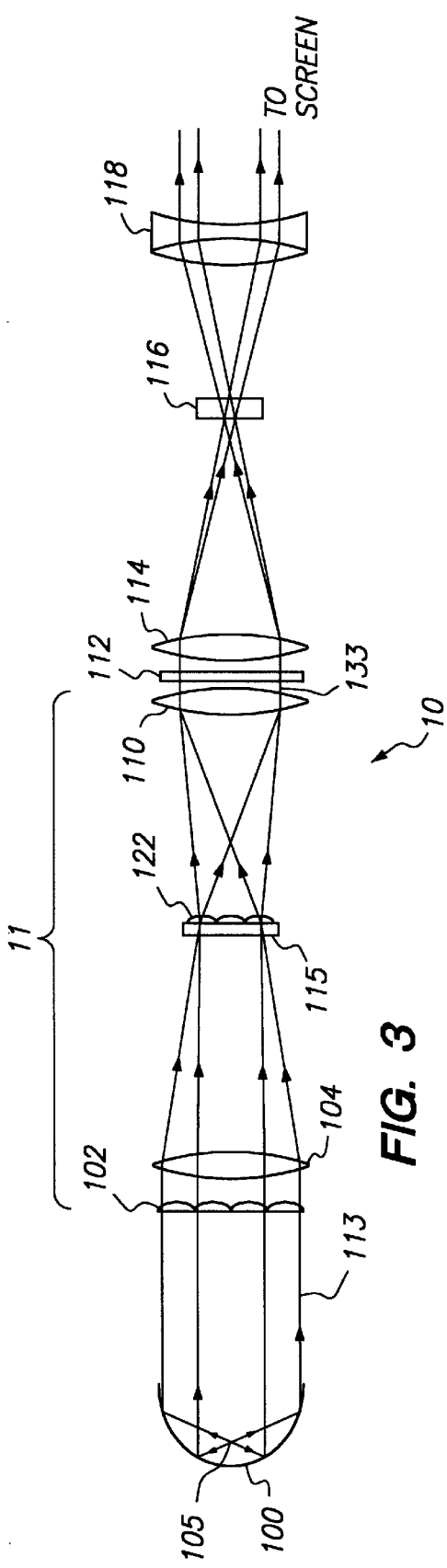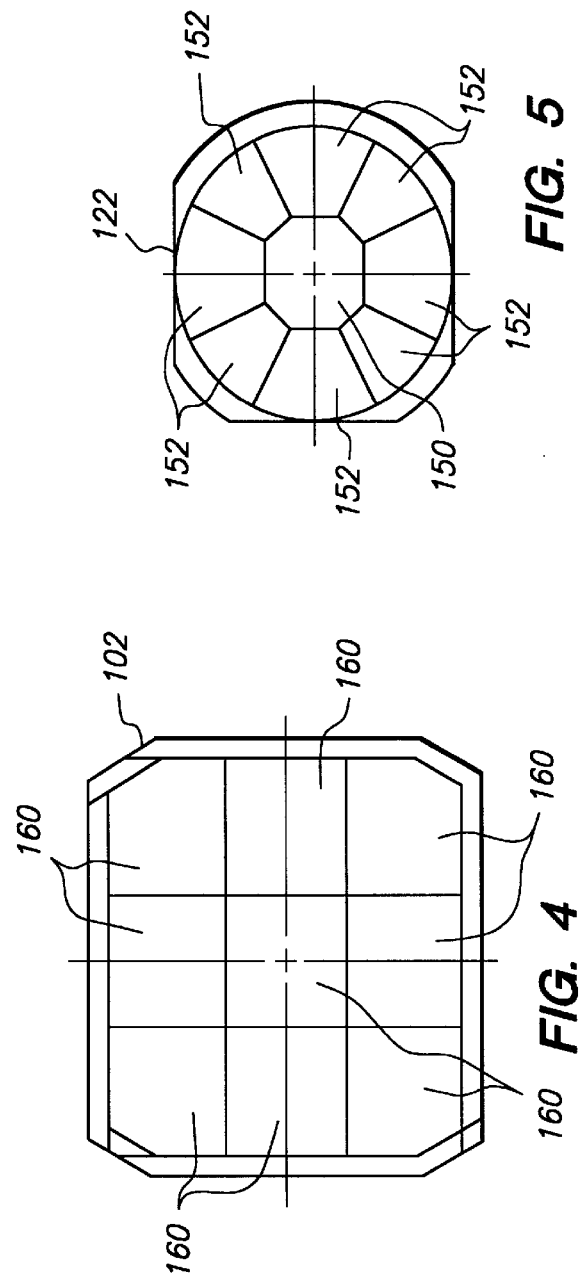

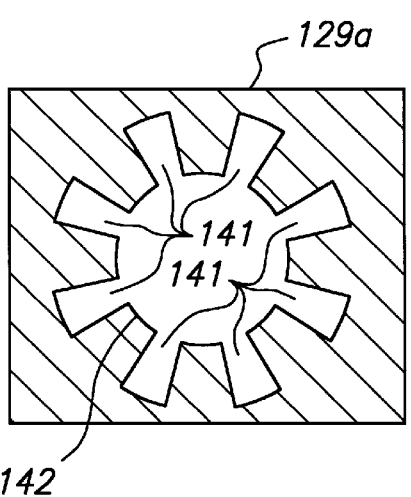 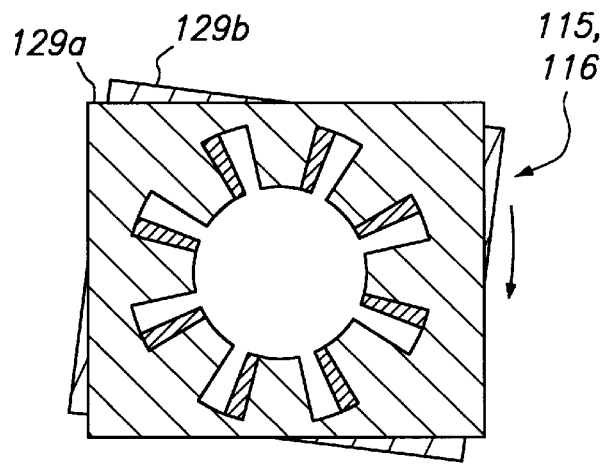
FIG. 10   FIG. 11
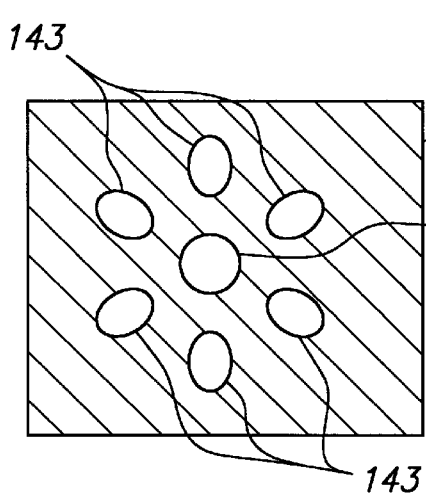 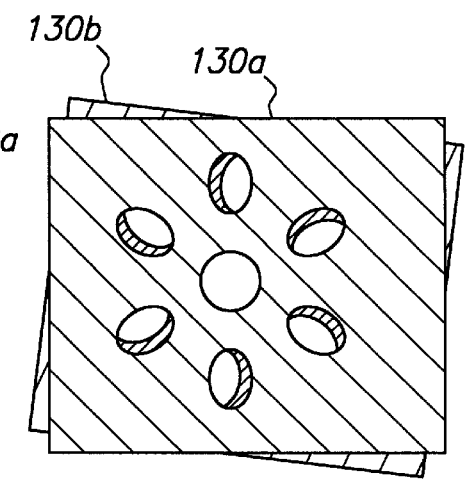
FIG. 12   FIG. 13

SYSTEM FOR CONTROLLING CONTRAST IN PROJECTION DISPLAYS

BACKGROUND OF THE INVENTION

The invention relates to controlling contrast in an optical projection system which uses a display cell.

Unlike an overhead projector which uses a transparency or slide to generate an image (e.g., a figure or photograph) on a screen, a typical liquid crystal projector generates the image via a liquid crystal display cell. The display cell is electrically controlled which allows, for example, a portable computer (interfaced to the display cell) to generate and revise the image during a presentation.

The display cell may be reflective or transmissive. If transmissive, light used for illumination passes through the display cell to project the image upon the screen. If the display cell is reflective, the light is selectively reflected off a back surface of the display cell to project the image on the screen.

Both display cells take advantage of the fact that light may either be scattered, absorbed, or reflected by subregions of the display cell, called pixels, to form the image. Each pixel is electrically placed in either a scattering state or a clear state. In the scattering state, the pixel scatters and/or absorbs the incident illumination light and appears dark in color. In the clear state, the pixel reflects the incident light (for a reflective display cell) or allows the incident light to pass (for a transmissive display cell) to appear bright in color.

The light used for illumination typically is generated by an arc lamp which is located near a parabolic mirror. The mirror collimates the light generated by the lamp and directs the collimated light toward the display cell. A portion of the collimated light is intercepted by the glass arc tube of the arc lamp which creates a dark spot on the display cell. To remove the dark spot, the projector may pass the collimated light (with the dark spot) through an optical integrator to average the illumination distribution of the light and thus, eliminate the dark spot.

The perceived contrast ratio of the image formed on the screen may be defined as the ratio of the brightest spot of the image to the darkest spot of the image, and the perceived contrast ratio is a function of the brightness of the room (where the image is being viewed) and the f-number (a measure of the amount of light introduced into the image by the projector) of the projector. The effect of the f-number is particularly important for projectors that utilize scattering to generate images or where unintentional scattering occurs. However, the perceived contrast ratio may be different than an actual contrast ratio (the contrast ratio of the image coming out of the projector) set by the projector due to the contribution of ambient light present in the viewing environment.

Accordingly, it would be useful if the contrast ratio of the projector could be controlled. The present invention provides a system and method that provides such control.

BRIEF SUMMARY OF THE INVENTION

Among the advantages of the invention are one or more of the following. The projector has an adjustable f-number. The perceived contrast ratio may be maximized for a given room brightness. Maximum contrast is provided at high illumination efficiency.

The details of one or more embodiments of the invention are set forth in the accompanying drawings and the description below. Other features, objects, and advantages of the invention will be apparent from the description and drawings, and from the claims.

Thus, there is provided in a first embodiment of the invention an optical projection system, comprising:
  a light source configured to project a beam of light;
  a lens array optically positioned to intercept the beam of light and generate at least one image thereof;
  at least one aperture assembly, having at least one aperture optically positioned to intercept the at least one image and to control the amount of light passing therethrough;
  a display cell having plural individually switchable pixels from an optically scattering state to a less optically scattering state, for forming a display image in the at least one image; and
  a projection lens for projecting the display image onto a screen.

In a second embodiment of the invention, there is provided an optical projection system, comprising:
  a light source configured to project a beam of white light;
  a lens array optically positioned to intercept the beam of white light and generate a set of multiple beamlets thereof;
  at least one aperture assembly having plural apertures and optically positioned to intercept the set of multiple images and control the amount of light passing therethrough;
  a beam splitter optically positioned to receive from the aperture assembly the set of multiple images and to split the set of multiple beamlets into three sets of multiple beamlets, each set containing a light beam within a different frequency band;
  three display cells, one for each set of multiple beamlets, each display cell having plural individually switchable pixels for forming a display image in the respective set of multiple beamlets; and
  a projection lens for projecting a display image onto a screen.

In a third embodiment of the invention, there is provided a method for use in an optical projection system, comprising the steps of:
  forming a beam of light;
  generating a set of multiple beamlets of the beam;
  intercepting the set of multiple beamlets and attenuating the amount of light contained in the set using an aperture assembly;
  individually controlling pixels of a display cell to generate a display image;
  directing the beamlets from the aperture assembly to the display cell; and
  directing the beamlets from the display cell to a projection lens.

In a fourth embodiment of the invention, there is provided a method for use in an optical projection system, comprising the steps of:
  forming a beam of light;
  generating a set of multiple beamlets of the beam;
  individually controlling pixels of a display cell to generate a display image;
  directing the set of multiple beamlets to the display cell;
  intercepting light emerging from the display cell;
  attenuating the amount of light so intercepted using an aperture assembly; and
  directing light from the aperture assembly to a projection lens.

In a fifth embodiment of the invention, there is provided a method for use in an optical projection system, comprising the steps of:

forming a beam of light;

generating a set of multiple beamlets of the beam;

intercepting the set of multiple beamlets and attenuating the amount of light contained in the set using a first aperture assembly;

individually controlling pixels of a display cell to generate a display image;

directing the set of multiple beamlets so attenuated to the display cell;

intercepting light emerging from the display cell and attenuating the amount of light so intercepted using a second aperture assembly; and directing light from the second aperture assembly to a projection lens.

In a sixth embodiment of the invention, there is provided a method for use in an optical projection system, comprising the steps of:

forming a beam of light;

generating a set of multiple beamlets of the beam;

intercepting the set of multiple beamlets and attenuating the amount of light contained in the set using an aperture assembly;

separating the light that passes through the aperture assembly into different frequency bands; and individually controlling pixels of a plurality of display cells to form a color display image in the respective light beams of the different frequency bands; and directing a superposition of the light of the different frequency bands towards a projection lens.

In a seventh embodiment of the invention, there is provided an optical projection system, comprising:

a light source configured to project a beam of light;

a lens array optically positioned to intercept the beam of light and generate a set of multiple images thereof;

at least one aperture assembly having plural apertures optically positioned to intercept the set of multiple images and to control the amount of light passing therethrough;

a plurality of display cells having plural individually switchable pixels for forming a display image in each of respective ones of the set of multiple images; and a projection lens for projecting the display images onto a screen.

In an eighth embodiment of the invention, there is provide a method for use with an optical projection system, comprising:

configuring a light source to project a beam of light;

optically positioning a lens array to intercept the beam of light and generate at least one image thereof;

optically positioning at least one aperture assembly to intercept the at least one image to control the amount of light passing therethrough;

positioning a display cell having plural individually switchable pixels to form a display image in the at least one image; and projecting the display image onto a screen with a projection lens.

BRIEF DESCRIPTION OF THE DRAWINGS

FIG. 3 is a schematic diagram of the projector.

FIGS. 4 and 5 are front views of lens arrays of the projector.

FIGS. 10 and 11 are front views of a variable aperture plate assembly.

FIGS. 12 and 13 are front views of another embodiment of a variable aperture plate assembly.

Like reference numbers and designations in the various drawings indicate like elements.

DETAILED DESCRIPTION OF THE INVENTION

Figure 1:
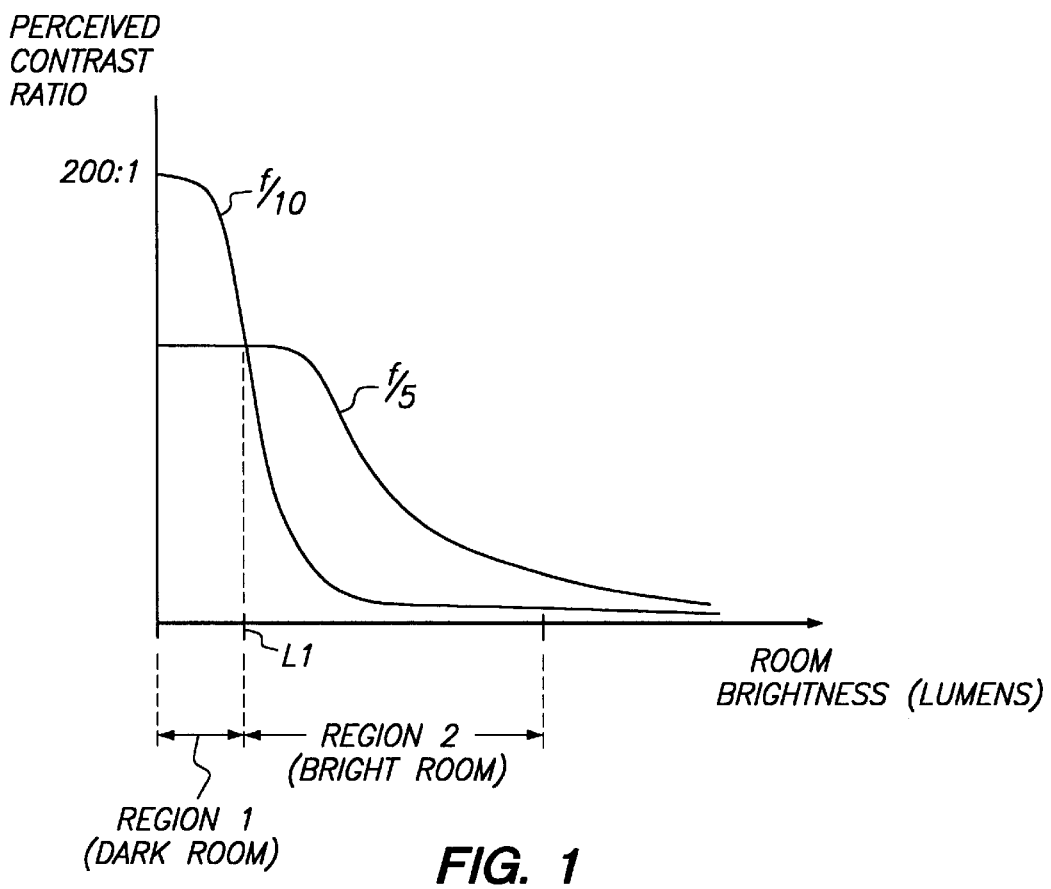
FIG. 1 is a graph illustrating the relationship of a perceived contrast ratio (y-axis) to room brightness (x-axis).

The quality of an image formed on a screen is quite often judged by the perceived contrast ratio of the image (i.e., the ratio between the darkest spot of the image to the brightest spot of the image). As shown in FIG. 1, the perceived contrast ratio is in part a function of the ambient light in the room where the image is viewed. To maximize the perceived contrast ratio of the image for both dark room and bright room viewing (where the brightness of the room is measured in lumens), i.e., to have a sharp image for all viewing environments, the f-number of a projector 10 (a measure of introduced screen illumination, see FIG. 3) is adjustable according to the present invention to accommodate both environments.

The perceived contrast ratio of the image does not always correspond to an actual contrast ratio of the image produced by the projector 10. For example, in order to view the image in a bright room (i.e., the bright room region 2), a small f-number (e.g., f/5) is desired.

To maximize the perceived contrast ratio in a bright room, where the darkest areas of the image correspond to the brightness of the typical screen (in the case where the projector is off), the illumination of the screen by the projector 10 may be increased by lowering the f-number.

Figure 2:
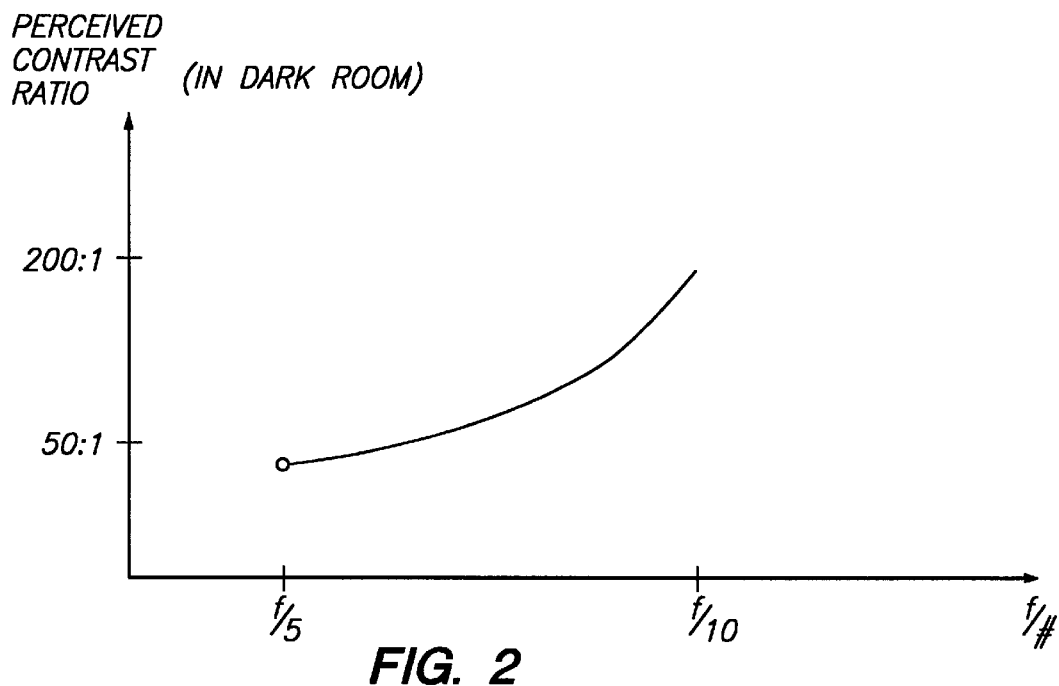
FIG. 2 is a graph illustrating the relationship of a perceived contrast ratio (y-axis) to an f-number (x-axis) of a projector using a polymer-dispersed LCD.

To maximize the perceived contrast ratio in a dark room (i.e., the dark room region 1), a larger f-number (e.g., f/10) is desired. As shown in FIG. 2, the perceived contrast ratio increases (e.g., from 50:1 to 200:1) with an increasing f-number (e.g., from f/5 to f/10) in a dark room, as ambient room illumination cast by the projector 10 upon the screen degrades the quality of the darkest spots of the image. For a dark room, the perceived contrast ratio approximates the actual contrast ratio of the image coming out of the projector 10.

As shown in FIG. 3, for purposes of generating light to illuminate the screen, the projector 10 has a light source such as an arc lamp 105. The arc lamp 105 is configured to convert the light into a cylindrically symmetric beam 113 by a reflector 100 such as a parabolic or an elliptical mirror. The beam 113 is directed toward, for example, a transmissive liquid crystal display cell 112 (e.g., a liquid crystal display cell having plural individually switchable pixels formed from a polymer-dispersed liquid crystal material). In order to remove the characteristic dark spot created by the arc lamp 105 (due to a glass arc tube of the arc lamp 105 intercepting the beam of light 113) and to efficiently convert the beam of light 113 into a rectangular illumination beam 133 conforming to the shape of the display cell 112, the beam 113 is passed through an optical integrator 11.

The optical integrator 11 includes a rectangular lens array 102 which intercepts the beam 113 and converts it into multiple arc images formed in the plane of another lens array 122. A converging lens 104 is disposed between the lens arrays 102 and 122 to direct the multiple arc images toward the lens array 122. The converging lens may be omitted or its power reduced if the flat surface of the lens array 102, as drawn, was instead made convex. In general, the power of the converging lens 104 or a convex surface of the lens array 102 may be altered to take advantage of the degree of convergence produced by the reflector 100 in the case where the reflector 100 is an elliptical mirror. Referring to FIG. 4, the lens array 102 may be formed from nine rectangular coplanar lenses 160 arranged in a 3×3 pattern. The optical integrator 11 serves to intercept the multiple images of the beam, average the images together to form averaged beam images, and project the averaged beam images towards the display cell.

Referring back to FIG. 3, just prior to being incident on the lens array 122, an aperture assembly or filter 115, discussed in more detail below in connection with FIGS. 10–13, is disposed to controllably adjust the f-number of the projector 10. The aperture assembly 115 may be positioned before or after the display cell 112. There may be more than one aperture assembly, e.g., one may be located before and one after the display cell 112. In this case, the image attenuated by a first aperture assembly and the image attenuated by a second aperture assembly may form conjugate images.

After passing through the aperture assembly 115, the light is incident on the lens array 122. Referring to FIG. 5, the lens array 122 may be formed from eight coplanar lenses 152 arranged in a circular pattern about a lens 150. Preferably, the number of lenses in the lens arrays 102 and 122 is equal. Lens 150 within the lens array 122 may have the shape of an octahedron and may form the center piece of the lens array 122. Eight other lenses 152 may surround the lens 150. Each of the lenses 152 may be wedge-shaped with two radial edges, each radial edge adjoining a radial edge of an adjacent lens 152. Each lens 152 radially extends from one of the edges of the lens 150 towards the outer edge of the lens array 122. Each lens of the lens array 122 projects an image of the incident arc (from the lens array 102) onto the display cell 112. In this case, as the lenses in the lens array 102 are rectangular, the images from the lens array 122 are also rectangular. A field lens 110 collimates the light from the lens array 122 prior to the light reaching the display cell 112.

The optical technique employed by the projector 10 is now described. In general, by superposition and by the action of the aperture assembly 115, the combination of the images projected by the lens array 122 produces a substantially uniform rectangular illumination beam image on the display cell 112.

Figure 6:
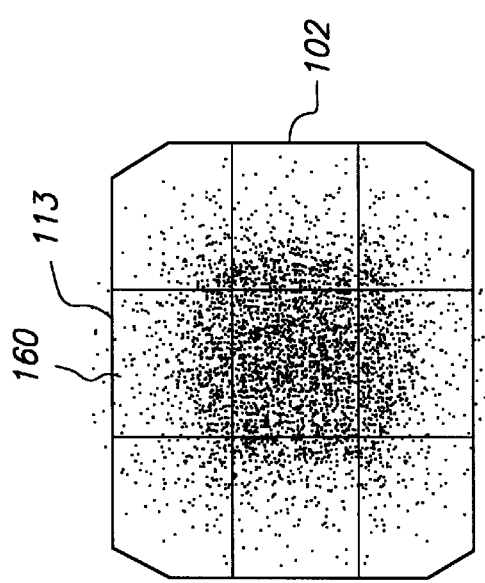

In particular, referring to FIG. 6, the lens array 102 breaks up the beam into as many constituent beams 113 as there are lenses 160 (see also FIG. 3). The constituent beams are referred to herein as "beamlets". It should be noted that the invention also encompasses the case where only one beamlet is present. FIG. 6, depicting the beam directly before the same is incident on the lens array 102, does not show this broken-up nature. It should further be noted that the beam profile, soon after exiting the lens array 102, does not differ very much from FIG. 6 as the multiple arc images only become strongly evident at and near the focus of the lens array 102.

The aperture assembly 115 and the lens array 122 may be placed at approximately the focal point of the lens array 102.

The aperture assembly 115 is discussed in more detail below. Here it is noted that the aperture assembly 115 is designed to adjust the aperture (and thus the contrast) of each individual beamlet emerging from the lens array 102. Thus, the number of apertures in the aperture assembly 115 may be equal to the number of lenses in the lens array 102. A converging lens 104 is used to, in part, limit the size of the lens array 122. The size of the lens array 122 determines the collection angle of the subsequent projection system (and thus the f-number) and thus is important in setting the contrast ratio.

Figure 7:
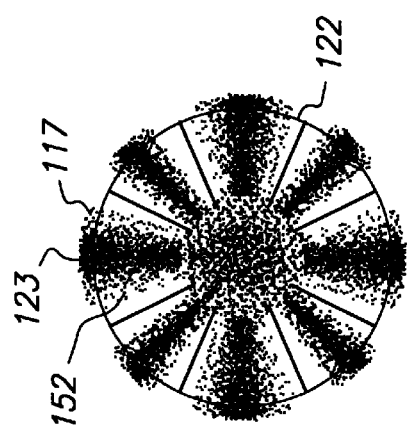

Each lens 152 in the lens array 122 accepts the beamlet 113 from the lens array 102 and transmits the beamlet 113 in response. At the lens array 122, the beamlet 113 is in the form of an image of the arc lamp 105. Each image of the arc lamp 105 may be slightly different as the arc lamp 105 has a finite extent, i.e., is not a point source, and thus each image is reflected in a slightly distorted manner by the reflector 100. Of course, due to imperfections in the reflector 100 and inaccuracies in the optical system, more than one beamlet 113 may occasionally be incident on the lens 152. However, the predominantly bright image in any given lens 152 within the lens array 122 should be from only one beamlet 113 from the lens array 102. Because the beamlet 113 exits from a rectangular aperture (lens 160), the transmitted beamlet 113 (and the image carried therein) is also rectangular (at a certain distance from the lens array 122). This is the situation shown in FIG. 7, where the images from the beamlets 113 appear roughly rectangular. It should be noted that FIG. 7 shows a superposition of images from the beamlets 113 on the lens array 122. Generally, images from the beamlets 113 do not appear rectangular at a point adjacent to the lens array 122; they only do so once they are more focused. In other words, the beamlets 113 form images of the rectangular apertures in the neighborhood of the display 112.

Figure 8:
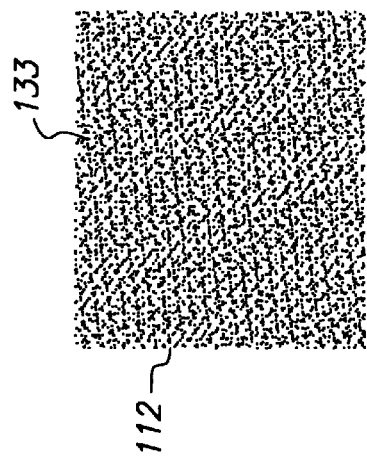
FIGS. 6–9 are illustrations of arc images from the projector.
Figure 9:
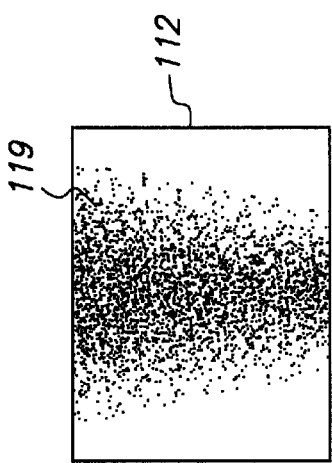

Each lens 152 is tilted, at the time when the lens array 122 is mounted, in a controlled and determinable fashion such that the superposition of images from the beamlets 113 results in a uniform rectangular image. FIG. 8 shows an intermediate stage in the superposition process, where a superposition image 119 is somewhat uniform. The image shown by FIG. 8 would appear at a location between the lens array 122 and the display cell 112. FIG. 9 shows the final stage of the superposition process, and more particularly how the superposition image 119 appears at the display cell 112. As can be seen, the image 119 is highly uniform across the display cell 112. The amount of tilt for the lenses 152 may be determined, for example, by computer simulation.

The aperture assembly 115 is now described in more detail. As shown in FIGS. 10 and 11, the aperture assembly 115 may be formed from two opaque aperture plates 129a and 129b. Each aperture plate has a circular center opening 142 and, for example, eight openings 141 radially extending from the center opening 142. The openings 141 and 142 are sized to match the arc images appearing in the plane of the lens array 122. When aligned (FIG. 10), the openings 141 and 142 of both plates 129a and 129b allow the entire arc images to pass, thereby setting a low f-number (a function of the amount of light that passes and the focal length of the collimating lens 110). Rotating the first plate relative to the second plate varies the amount of overlap and thus varies the sizes of the plural apertures. In particular, when one of the plates is rotated relative to the other plate (FIG. 11), the overlap of the openings 141 restricts the amount of light from each of the beamlets 113, thereby decreasing the f-number. The opaque portions of the aperture plates also block any stray light that is not a part of the beamlets formed in the plane of the lens array 122.

As shown in FIGS. 12 and 13, the plates 129a and 129b may be replaced with plates 130a and 130b having elliptical apertures 143 or other shapes such as circular to compensate for optical aberrations and efficiently allow the desired parts of the images to pass through the plates.

In order to form the image displayed on the screen, the pixels of the display cell 112 that are black scatter the illumination light that strikes the display cell 112. To prevent such scattered light from being projected onto the screen (which would degrade the quality of the darker portions of the image), the projector 10 may have, as noted above, another aperture assembly 116 of similar design to the aperture assembly 115 (see FIG. 3). The aperture assembly 116 is located on the other side of the display cell 112 from the arc lamp 105. A field lens 114 intercepts images from the beamlets projected by the display cell 112 and projects these images onto a plane containing the assembly 116. The assembly 116 may have the same angular orientation as the assembly 115 (i.e., the openings of the assemblies 115 and 116 are aligned) so that the images projected by the display cell 112 onto the aperture assembly 116 are conjugate to the arc images formed at the assembly 115. A mechanical mechanism (not shown) inside the projector 10 may be used to ensure that the openings 141 of both assemblies 115 and 116 close and open together.

For purposes of forming the image on the screen, the projector 10 may also have a projection lens 118. The projection lens 118 intercepts the beamlets from the aperture assembly 116 and forms the image in the plane of the screen.

Figure 14:
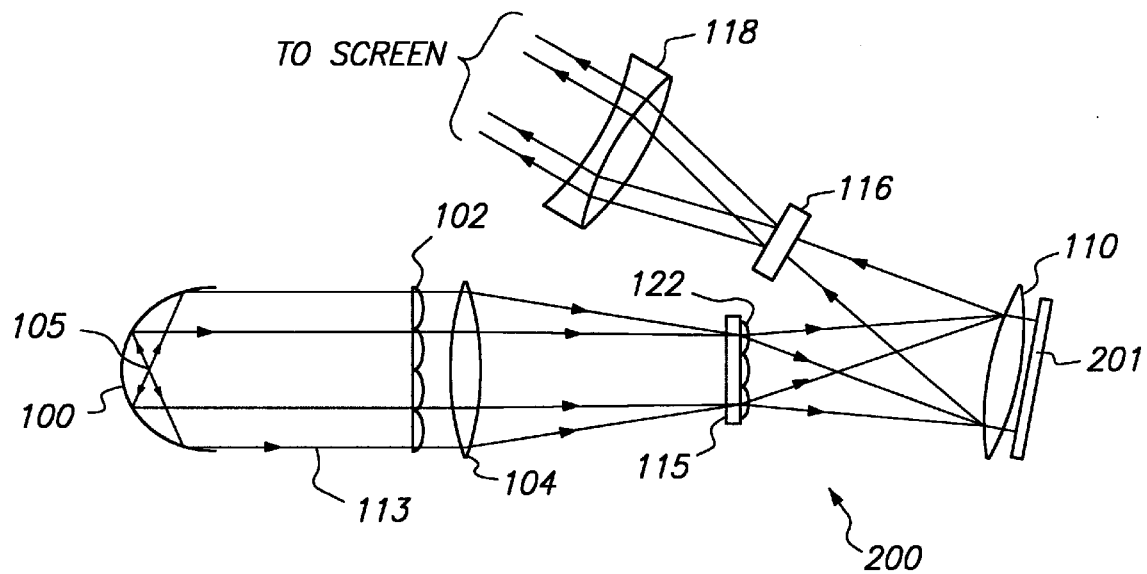
FIGS. 14 and 15 are schematic diagrams of a projector.

As another example, as shown in FIG. 14, another projector 200 may have a reflective liquid crystal display cell 201. The components of the projector 200 are similar to the components of the projector 10, with the major differences being the absence of the lens 114 and the fact that the components of the projector are located along two optical axes. In other words, the lens arrays 102 and 122 are located along a first optical axis (extending to the cell 201), and the projection lens 118, the aperture assembly 116, and the screen are along another (second) optical axis (also extending to the cell 201, but at an angle to the first optical axis).

Figure 15:
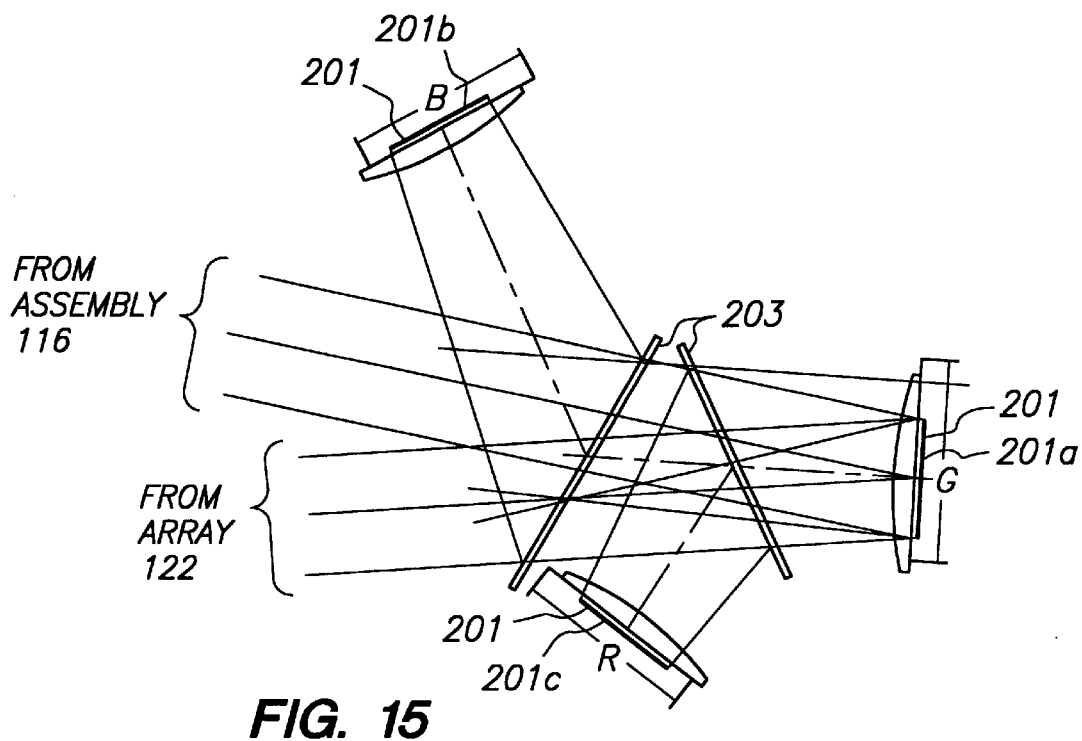

Referring to FIG. 15, the above-described system may also be used in a color projector 202. In this arrangement, white light (passing through the aperture assembly 115) coming from the lens array 122 is separated into different frequency bands such as the red, green and blue primary colors by beam splitters such as dichroic plates 203. The red, green and blue beams strike reflective liquid crystal display cells 201c, 201a and 201b, respectively, for example, which create images corresponding to the respective color. The resultant three color images are combined near or in front of the aperture assembly 116. The display cells 201a, 201b and 201c may also be transmissive and may be formed from a polymer dispersed liquid crystal material.

Of course, it should generally be noted that the device embodied in FIG. 3 may form a subset of a larger color system. That is, the device embodied in FIG. 3 may be used to process one color of light, and that two or more other similar devices may be used to process other colors of light.

As noted above, a preferred display cell comprises polymer-dispersed liquid crystal. Polymer dispersed liquid crystal may be made by emulsion or phase separation techniques. Illustrative disclosures relating to the preparation of polymer-dispersed liquid crystals and their use in display cells include Fergason, U.S. Pat. Nos. 4,435,047 (1984), 4,606,611 (1986), 4,616,903 (1986), and 4,707,080 (1987); Pearlman et al., U.S. Pat. No. 4,992,201 (1991); Wartenberg et al., U.S. Pat. No. 5,202,063 (1993); Reamey, U.S. Pat. No. 5,335,101 (1994); Reamey et al., U.S. Pat. No. 5,405,551 (1995); Havens et al., U.S. Pat. No. 5,585,947 (1996); Wu et al., U.S. Pat. No. 4,671,618 (1987); West et al., U.S. Pat. Nos. 4,673,255 (1987) and 4,685,771 (1987); Doane et al., U.S. Pat. No. 4,688,900 (1987); and Dainippon Ink and Chemicals, EP 0,313,053 (1989); the disclosures of which are incorporated herein by reference.

A number of embodiments of the present invention have been described. Nevertheless, it will be understood that various modifications may be made without departing from the spirit and scope of the invention. Accordingly, other embodiments are within the scope of the following claims.

What is claimed is:

1. An optical projection system, comprising:

a light source configured to project a beam of white light;

a lens array optically positioned to intercept the beam of white light and generate a set of multiple beamlets thereof;

at least one aperture assembly comprising a first plate and a second plate, each plate having plural openings therein, the openings in the second plate able to overlap openings in the first plate to define plural apertures variable in size, the second plate being rotatably mounted to the first plate such that rotating the second plate relative to the first plate varies the amount of overlap between the openings in the first and second plates and consequently varies the sizes of the plural apertures, the plural apertures being optically positioned to intercept the set of multiple images and control the amount of light passing therethrough;

a beam splitter optically positioned to receive from the aperture assembly the set of multiple images and to split the set of multiple beamlets into three sets of multiple beamlets, each set containing a light beam within a different frequency band;

three display cells, one for each set of multiple beamlets, each display cell having plural individually switchable pixels for forming a display image in the respective set of multiple beamlets; and a projection lens for projecting a display image onto a screen.

2. The optical projection system of claim 1, wherein the at least one aperture assembly is optically positioned between the display cell and the projection lens.

3. The optical projection system of claim 1, wherein the at least one aperture assembly is optically positioned between the lens array and the display cell.

4. The optical projection system of claim 1, wherein the at least one aperture assembly comprises a first aperture assembly optically positioned between the lens array and the display cell and a second aperture assembly optically positioned between the display cell and the projection lens.

5. A method for use in an optical projection system, comprising the steps of:

forming a beam of light;

generating a set of multiple beamlets of the beam;

intercepting the set of multiple beamlets and attenuating the amount of light contained in the set using an aperture assembly comprising a first plate and a second plate each of which has plural openings therein, the openings in the second plate capable of overlapping the openings in the first plate to define the plural apertures, the attenuating step includes the step of rotating the first plate relative to the second plate to vary the amount of overlap between the openings in the first and second plates and consequently varying the sizes of the plural apertures;

individually controlling pixels of a display cell to generate a display image;

directing the beamlets from the aperture assembly to the display cell; and directing the beamlets from the display cell to a projection lens.

6. The method of claim 5, wherein the apertures of the first plate are circular.

7. The method of claim 5, wherein the apertures of the first plate are elliptical.

8. The method of claim 5, wherein the forming step includes:

using an arc source configured to generate light; and using a reflector to convert the light from the arc source into the beam of light.

9. The method of claim 8, wherein the reflector comprises a parabolic or an elliptical mirror.

10. The method of claim 5, wherein the generating step includes the step of passing the light through coplanar rectangular lenses.

11. The method of claim 5, further comprising the steps of:

intercepting the multiple beamlets;

averaging the beamlets together to form an average image contained in the beamlets; and directing the averaged beam toward the display cell.

12. The method of claim 5, wherein the light is colored light.

13. The method of claim 8, wherein the reflector comprises an elliptical mirror.

14. A method for use in an optical projection system, comprising the steps of:

forming a beam of light;

generating a set of multiple beamlets of the beam;

individually controlling pixels of a display cell to generate a display image;

directing the set of multiple beamlets to the display cell;

intercepting light emerging from the display cell;

attenuating the amount of light so intercepted using an aperture assembly comprising a first plate and a second plate each of which has plural openings therein, the openings in the second plate capable of overlapping the openings in the first plate to define the plural apertures, the attenuating step includes the step of rotating the first plate relative to the second plate to vary the amount of overlap between the openings in the first and second plates and consequently varying the sizes of the plural apertures; and directing light from the aperture assembly to a projection lens.

15. The method of claim 14, wherein the apertures of the first plate are circular.

16. The method of claim 14, wherein the apertures of the first plate are elliptical.

17. A method for use in an optical projection system, comprising the steps of:

forming a beam of light;

generating a set of multiple beamlets of the beam;

intercepting the set of multiple beamlets and attenuating the amount of light contained in the set using a first aperture assembly;

individually controlling pixels of a display cell to generate a display image;

directing the set of multiple beamlets so attenuated to the display cell;

intercepting light emerging from the display cell and attenuating the amount of light so intercepted using a second aperture assembly; and directing light from the second aperture assembly to a projection lens;

wherein at least one of the attenuating steps includes the step of rotating a first plate relative to a second plate, each of the first and second plates having plural openings therein, the openings in the second plate capable of overlapping the openings in the first plate to define the plural apertures, the rotating step varying the amount of overlap between the openings in the first and second plates and consequently varying the sizes of the plural apertures.

18. The method of claim 17, wherein the images contained in the beamlets attenuated by the first aperture assembly and the images contained in the beamlets attenuated by the second aperture assembly form conjugate images.

* * * * *